United States Patent [19]

Deleuil

[11] 4,340,521

[45] Jul. 20, 1982

[54] PRESSURE COMPACTING OF SETTABLE PLASTER COMPOSITIONS

[75] Inventor: Michel Deleuil, Lyons, France

[73] Assignee: Rhone-Poulenc Industries, Paris, France

[21] Appl. No.: 200,084

[22] Filed: Oct. 23, 1980

Related U.S. Application Data

[63] Continuation-in-part of Ser. No. 88,588, Oct. 26, 1979, abandoned, which is a continuation of Ser. No. 876,492, Feb. 9, 1978, abandoned.

[30] Foreign Application Priority Data

| Feb. 9, 1977 [FR] | France | 77 03561 |
| Apr. 4, 1977 [FR] | France | 77 10060 |
| Jul. 6, 1977 [FR] | France | 77 20773 |

[51] Int. Cl.$^3$ ............... C08L 61/24; C04B 11/14
[52] U.S. Cl. ............... 524/2; 52/596; 106/109; 106/110; 106/111; 106/116; 264/333; 524/5; 524/6
[58] Field of Search ............... 106/110, 111, 109, 116; 264/333; 52/596; 423/555; 260/29.4 R, 29.6 S; 525/3

[56] References Cited

U.S. PATENT DOCUMENTS

| 1,652,162 | 12/1927 | Brookby | 106/109 |
| 1,703,097 | 2/1929 | Chassevent | 264/77 |
| 3,198,858 | 8/1965 | Hansen | 264/35 |
| 3,666,581 | 5/1972 | Lane | 156/39 |
| 3,809,566 | 5/1974 | Revord | 106/110 |

FOREIGN PATENT DOCUMENTS

| 1125849 | 11/1956 | France . |
| 1181150 | 6/1959 | France . |
| 1511233 | 12/1967 | France . |
| 2098706 | 10/1972 | France . |
| 2224263 | 10/1974 | France . |
| 43-77270 | 10/1968 | Japan . |
| 47-43500 | 5/1972 | Japan . |
| 6809939 | 1/1970 | Netherlands . |

*Primary Examiner*—Theodore E. Pertilla
*Attorney, Agent, or Firm*—Burns, Doane, Swecker & Mathis

[57] ABSTRACT

A settable molding composition comprising a mix of synthetic plaster with an extraneous water source, including a "wet" synthetic gypsum or a mixture of same and free water, is readily pressure compacted or molded into a plurality of useful shaped articles, e.g., strong, modular building materials. The plaster can comprise from about 30% to about 99% by weight of the mix and has a Blaine surface area ranging between 2,500 and 7,000 cm$^2$/g, with the amount of water in the mix from the water source being in excess of that amount stoichiometrically required for ultimate complete setting of the mix, said excess of water being in an amount no greater than 15% of the total weight of said mix. The resulting shaped articles are effectively set, even in the absence of any drying step.

14 Claims, No Drawings

PRESSURE COMPACTING OF SETTABLE PLASTER COMPOSITIONS

CROSS REFERENCES TO RELATED APPLICATIONS

This is a continuation-in-part of application Ser. No. 88,588, filed Oct. 26, 1979, now abandoned, which is in turn a continuation of application Ser. No. 876,492, filed Feb. 9, 1978, now abandoned.

BACKGROUND OF THE INVENTION

1. Field of the Invention

The present invention relates to the pressure compacting or molding of mixtures comprising plaster and a water donor, such as "wet" synthetic gypsum or a mixture of same with water itself, with "wet", as used herein, being later defined. More particularly, the invention relates to the pressure compacting of such a plaster mix wherein the plaster is synthetic and has a Blaine surface in the range of between 2,500 and 7,000 $cm^2/g$, the percentage by weight of the synthetic plaster in the admixture is within the range of between 30% and 99%, and the excess water needed with respect to the stoichiometric amount necessary for the ultimate setting of the composition is no greater than about 15%, i.e., between 0 and 15%, of the total weight of the mixture.

The process of the invention is, moreover, well adapted for the manufacture of modular constructional units, unitarily cast and admirably suited as building materials, in particular as bricks, squares, blocks, plates, composites, facades, casings, flooring, load-bearing beams, and the like.

The invention features an improvement in the pressure compacting of "wet" gypsum/plaster admixtures, especially the low pressure integral molding thereof into modular constructional units and the building materials resulting therefrom.

2. Description of the Prior Art

The pressure casting of mixtures of plaster and gypsum has already been proposed to this art. Netherlands Pat. No. 6,809,939 specifically describes a process which consists of mixing gypsum [hemihydrated calcium sulfate], a residuum of a certain technique for the manufacture of phosphoric acid, with "natural" plaster [semihydrated calcium sulfate] in a weight proportion of a maximum of 5/1, and of compressing this mixture in a mold under a pressure of at least 100 $kg/cm^2$. The amount of plaster used in the mixture depends on the resultant material sought to be produced and on the water content of the residual gypsum. It is assumed, moreover, that the water comprising gypsum, said water being present in the form of water physically combined [water of hydration or crystallization] or superficially absorbed, reacts under the effects of strong pressure with the plaster in the mixture to form dihydrated calcium sulfate, the setting of which yields a material especially suited for use in the agricultural industry, for use in making bricks or plates, for acoustical applications, and for use in the cement industry.

However, the necessity for compacting the gypsum/plaster mixtures, in accordance with the aforenoted Netherlands patent application, at pressures higher than 100 $kg/cm^2$ in order to obtain suitable materials, nonetheless markedly reduces the advantages of such a process both in terms of its practical as well as economic aspects.

Moreover, production of cast materials from gypsum/plaster mixtures exhibiting excellent mechanical properties as well as excellent surface quality is a desideratum for manufacturing economically feasible elements. By providing cast articles with a homogeneous, smooth surface, the cost of labor in subsequent finishing work is greatly reduced.

Another patent which discloses the casting of natural plaster and gypsum is French Pat. No. 2,196,299, which describes the manufacture of cast pieces from water setting mixtures comprising a special "natural" gypsum and a chemical synthetic gypsum.

Accordingly, it is an object of the instant invention to provide a process for producing plaster and gypsum based elements having very high mechanical strength.

Moreover, it is an object of the instant invention to provide a moldable composition which can provide a molded article with smooth and improved surface quality and very high mechanical strength.

It is still another object of the instant invention to provide a homogeneous and economically feasible load bearing block.

Other objects, features and advantages will become apparent to those skilled in the art upon a study of this disclosure and the appended claims.

SUMMARY OF THE INVENTION

It has now unexpectedly been discovered that it is possible to mold building materials possessing good properties, particularly mechanical properties, by compacting novel wet synthetic gypsum/synthetic plaster mixtures, which mixtures can be compacted under conditions of low pressure. Moreover, the materials obtained from compacting the synthetic gypsum/synthetic plaster mixtures of the instant invention exhibit excellent surface quality, i.e., a much smoother surface, as well as particularly good mechanical properties.

DETAILED DESCRIPTION OF THE INVENTION

The present invention features, in a first embodiment, the pressure compacting or molding of mixtures comprising wet synthetic gypsum and synthetic plaster, characterized in that:

[i] The synthetic plaster employed has a Blaine surface between about 2,500 and 7,000 $cm^2/g$;

[ii] The Blaine surface of the synthetic gypsum is between about 1,000 and 4,000 $cm^2/g$;

[iii] The wet gypsum has a water content between about 15 and 40%;

[iv] The percentage by weight of the synthetic plaster in the wet gypsum/plaster mixture is between 30 and 60%; and

[v] The weight ratio of plaster/wet gypsum is such that the excess water needed with respect to that stoichiometric amount necessary for subsequent setting of the mixture is no greater than 15%, i.e., between 0 and 15%, of the total weight of the mixture.

The origin of the gypsum employed according to the invention is synthetic. For example, it is possible to use for the purpose of the invention wet, synthetic gypsum originating from:

[a] The industrial production of acids by the action of sulfuric acid on a calcium salt; among these processes are mentioned the production of phosphoric acid by the action of sulfuric acid on calcium phosphate, of hydrofluoric acid by treating fluorine with sulfuric acid, or boric acid and the organic acids, such as citric, tartaric, etc.;

[b] The manufacture of sodium carbonate or of rayon by the action of residual calcium chloride on sodium sulfate;

[c] The activation of clay by the action of calcium carbonate on residual aluminum sulfate;

[d] The preparation of phenols and of humic acid by the action of sulfuric acid on residual calcium oxalate; and

[e] The neutralization of acidic industrial effluents, particularly by lime or calcium carbonate. These acid effluents may be of diverse origin, such as, for example, the industrial production of titanium oxide by the sulfate process, descaling techniques utilized in steel making, refining processes, copper or zinc sulfates.

It is most preferred to employ a gypsum originating from the manufacture of phosphoric acid, hereafter referred to as "phosphogypsum", for the purposes of the invention. Preferably, the phosphogypsum is obtained from phosphoric acid manufacturing processes such as those described in French Pat. Nos. 1,125,849 and 1,181,150, or as a material resulting from the filtration of the liquid of reaction upon the acid treatment of phosphates, for example, filtration by means of a filter described in French Pat. No. 1,327,693, optionally after the same has been subjected to a stage of purification or even neutralization. The purification stage generally includes simple washing followed by filtration or by drying or hydrocyclonage followed by filtration or drying, or else flotation followed by filtration; it is thus evident that this purification stage may easily be adapted to all manners known to those skilled in the art, as a function specifically of the nature of the impurities to be eliminated from the gypsum and the granulometry of the gypsum treated. Concerning the details of the purification oeprations specifically by hydrocyclonage, it is possible to operate in the manner described in French Pat. No. 1,601,411. In addition, the potential neutralization stage of the phosphogypsum can be performed advantageously by the process described in the French patent application No. 75.12923. Said French patent application No. 75.12923 describes a process for the purification of phosphogypsum in which the acid impurities in synthetic gypsum are neutralized by means of an alkaline reaction, by placing the synthetic gypsum in an aqueous suspension, then contacting the suspension with a compound according an alkaline reaction in an amount Q chosen as a function of the fluorine content (p) of the gypsum, in a reactor equipped with means for agitation, so as to render the reaction medium essentially homogeneous, the contact being maintained for that period of time necessary for complete chemical reaction; at least a portion of the suspension is then extracted and subjected to purification by washing and filtering. The compound according the alkaline reaction is selected from a group consisting of lime, calcium carbonate, soda, sodium carbonate, potash, potassium carbonate, magnesia, magnesium carbonate. The quantity Q of the compound according an alkaline reaction employed is selected by reference to the formula $Q = Q_o + Kp$, where Q represents the number of $OH^-$ equivalents per kg of gypsum, $Q_o$ is the number of $OH^-$ equivalents to neutralize soluble acidity in the water per kg of gypsum, K is a coefficient comprised between 0.2 and 0.6, the value of which depends on the nature of the fluorine compounds present in the gypsum. A constant pH of 7 to 13 is maintained in the reactor, together with a temperature selected between ambient temperature and 90° C.

The gypsum utilized in accordance with this first embodiment of the invention has a water content preferably between 15 and 40%; and it is of advantage to use gypsum in a powdery state in order to prevent the same from becoming pasty, as is the case when using gypsum with a water content in excess of approximately 40%. In order to obtain molded articles having good properties specifically by employing low compacting pressures, it is desirable to utilize gypsums having a water content between 25 and 35%, preferably in the vicinity of 30%.

Further, it is advantageous for the same purpose to employ gypsums which are of fine granulometry, but not ground; as this permits the maintenance of a powdery state for the gypsum having a high water or moisture content, which is preferred as described above. The corresponding Blaine surface of such gypsums is preferably between 1,000 and 4,000 cm$^2$/g.

By way of variation, it is possible according to the invention to replace the gypsum by any material capable of supplying the water necessary for the setting of the plaster after compression. Thus, it is permissible to employ according to the process of the invention, as partial replacement for the gypsum, naturally humid or moist fibers, moist vermiculite, sand, moist ferrous sulfate, such as that originating from the production of titanium oxide by the sulfate process, and various other moist mineral powders.

The origin of the plaster used according to the process of the invention is also of a synthetic origin, as opposed to a natural plaster. The calcium sulfate alpha semihydrate based plasters, or those plasters based upon the beta semihydrate of calcium sulfate, may conveniently be utilized. Such plasters contain essentially semi-hydrate, but may contain small proportions of anhydrite II and anhydrite III and, additionally, their residual gypsum content may amount to approximately 15% by weight.

In accordance with a particular preferred object of the invention, it is advantageous for the plaster employed to have a Blaine surface area between 2,500 and 7,000 cm$^2$/g, and be preferably of controlled granulometry. Controlled granulometry is defined as a granulometric distribution such that the major portion of the particles has a dimension between 20 and 100 microns; such a granulometric distribution is exhibited notably by plasters of phosphogypsum origin, which advantageously display granulometric curves centered at about 40 microns. This preferred fine particle size and controlled granulometry provides a plaster of low apparent density, which is a particularly desirable object of the invention. A plaster of phosphogypsum origin is very well suited to this end because it displays, whether directly or upon simple grinding, the necessary characteristics. Thus, it is preferred to employ a phosphoplaster, i.e., a synthetic plaster of phosphogypsum origin.

An especially suitable plaster of phosphogypsum origin can be obtained by drying and calcining a phosphogypsum specifically obtained via the aforenoted processes. Various methods for drying and calcination may be employed to produce plaster suitable for attaining the objectives of the invention, and among these there may be mentioned methods utilizing a continuous rotary furnace adapted for indirect heating, an indirectly heated discontinuous rotary furnace, a screw calcinator [such as that described for effecting the process of French Pat. No. 1,601,411], pneumatic drying and calcination in a fluidized bed [such as described in French patent application No. 75.16119] or pneumatic type calcination in an apparatus of the type described in French Pat. No. 2,257,326. The French patent application No. 75.16119, supra, specifically relates to a process for the heat treatment of gypsum to convert it into the semihydrate by indirect heating in a fluidized bed, characterized by the fact that in a continuous combination the following operation is performed: the continuous fluidization of finely divided gypsum by means of a gas consisting essentially of air; a gas supply means for fluidization between the minimum theoretical velocity below which the bed is static and a maximum which is approximately six times this velocity; essentially horizontal entrainment of the material from one end of the bed to the other, with simultaneous progression of the dehydration reaction; the addition of heat by means of heating elements submerged in the fluidized bed, such that a temperature differential of several times a ten degree Celsius increment, between the average temperature of each heating element and that of the fluidized material, is effected; the elimination of the water vapor produced by the reaction; and, at the downside end of the outlet of the fluidized bed, recovering a product almost completely transformed into the semihydrate. In the independent heating elements a continuous circulation of a hot liquid is established so that at the inlet of each heating element an almost constant temperature between 180° C. and 300° C. is maintained. The temperature of the hot fluid is controlled at the outlet of each heating element, so that it is lower by 30° C. to 40° C. than the inlet temperature, such control being by means of monitoring the rate of the flow of the hot fluid.

The wet synthetic gypsum/synthetic plaster mixture according to the first embodiment of the invention is preferably such that the percentage by weight of the synthetic plaster in the mixture is between 30 and 60%, and preferably between 40 and 60%. This proportion of synthetic plaster is adjusted in the mixture as a function of the excess water sought to be added within the limits of the invention and such addition being a predetermined function vis-a-vis the mechanical properties ultimately sought to be attained. Thus, according to the present invention, the ratio by weight of the synthetic plaster to the moist synthetic gypsum is such that any excess water [excess with respect to that amount of water stoichiometrically required to subsequently set the mixture] comprises between 0 and 15% of the total weight of the mixture; and preferably, this proportion ranges between 2 and 8%. The proportion of the synthetic plaster employed in the mixture thus depends on the sorbed water content of the synthetic gypsum, the working amount of water selected to be added, and on the specific composition of the hydrates comprising the synthetic plaster.

The range of preferred plaster content according to the invention may be expressed by the following equation:

$$0 \leq (E - \alpha P)/(100 + P) \leq 0.15$$

In this equation, P grams of plaster are mixed with 100 g of moist gypsum containing E grams of free water [water other than of hydration]. The hydrate composition of the plaster is such that for 100 g of the plaster, same will be stoichiometrically converted into the gypsum state with $100\alpha$ g water.

The excess working water is described as $e = E - \alpha P$ and thus the limitations of e within the range $0\% \leq e \leq 15\%$ are expressed as:

$$\alpha P \leq E$$

$$(\alpha + 0.15)P \geq E - 15$$

If, for example, the gypsum contains 25% free water (E=25), and if the plaster consists of the pure semiydrate $CaSO_4 \cdot \frac{1}{2} H_2O$ ($\alpha = 27/145 = 0.186$), and one wishes to work with excess water = 3%, the expression becomes:

$$\frac{E - \alpha P}{100 + P} = 0.03$$

$$25 - 3 = P(0.186 + 0.03)$$

$$P \simeq 102 \text{ g per 100 g of the moist gypsum.}$$

Prior to compacting, it is necessary to thoroughly mix the moist gypsum and the plaster. This operation may be performed by any of the known means, for example with the aid of a turbine or helical type agitator or a screw mixer.

The preferred pressures of compression used for the preferred embodiment of the invention in its first aspect range between 30 and 100 kg/cm²; it is evident, however, that by employing higher pressures, useful materials are also obtained. The present invention is thus not limited by the use of the aforesaid preferred pressures; the process can also be performed by using pressures higher than 100 kg/cm². In fact, in keeping with the objects of the present invention, mechanical properties similar to those attained with traditional plaster preforms [for example, 25 to 30 kg/cm² bending strength and 60-80 kg/cm² of compressive strength] can also be attained by using the moist synthetic gypsum/synthetic plaster mixtures noted above and compressing at pressures of less than 100 kg/cm². If higher performance is desired, [for example, 50-60 kg/cm² in bending strength] it is sufficient to merely increase the weight of the mixture to be compressed by a given final volume. This has very obviously the effect of increasing the pressure required for compression, but the quality of the mixtures is such that the desired performance is always obtained with minimum compression pressures.

The pressure may be applied in but a single plane to the mixture or simultaneously in opposing planes. It may also be advantageous to precompress the mixture.

The period of time over which the pressure is applied may vary; however, it has been found that, typically, compressing for periods of rather short duration, for example, on the order of 15 to 90 seconds and even for less than 15 seconds, immediately provides manipulative materials. This speed of compacting permits the rapid manufacture of objects having good properties and constitutes a marked advantage from an industrial point of view and lends another dimension to the process of the invention.

It should be noted that an additional aspect of the invention is the extremely low energy cost of the process to the extent that, on the one hand, it is not necessary to dry the compressed material and, on the other, the material contains but 30 to 60% synthetic plaster; synthetic plaster requiring drying and calcination of gypsum for its manufacture.

Another advantage of the process of the invention is that it affords great freedom in the choice of the nature and quantities of potential additives. Thus, it may be of advantage to add to the mixture, or to its constituents, various additives, such as water repellents [methyl siliconates], neutralizing agents [lime, calcium carbonate, etc.], reinforcing agents [mineral or organic fibers], minerals [aluminum sulfate or lime], polymers [urea-formaldehyde resins or polyvinylacetates] and various fillers [gravel or kaolin].

As a variant of the process of the invention, water may be added if the synthetic gypsum employed be either dry or containing an insufficient amount of water. In such cases, the water required may be added either to the gypsum prior to mixing or after having mixed the dry gypsum or the gypsum lacking in water content and the synthetic plaster at the mold level, immediately prior to compression. This addition of water obviously must be made while keeping in mind the other parameters of the process of the invention.

The process of the invention is applicable to the manufacture of all cast articles regardless of their shape or dimensions. It is particularly suitable for the manufacture of bricks, squares, blocks, plates, juxtaposed composites, partitions, facades, covers, beams, and the like.

The materials obtained specifically have enhanced mechanical properties and display very little water absorption during immersion. Thus, for example, bending strength and compressive strength measured on 4 cm × 4 cm × 16 cm specimens, 24 hours after compression and produced with compacting pressures of less than 100 kg/cm² vary within the following limits:

$25 \leq$ bending, kg/cm² $\leq 55$ $25 \leq$ compression, kg/cm² $\leq 180$

Surface hardness, Shore scale C $\geq 60$

In addition, for example, by increasing the weight compacted for the same mold volume (4×4×16 cm) and, accordingly, also the compacting pressure, bending strengths of up to 100 kg/cm² and compressive strengths of up to 400 kg/cm² may be obtained, under a compacting pressure of up to 250 kg/cm².

Further, the water uptake by immersion of the shaped articles obtained according to the invention is very low; thus, for example, the immersion in water for 24 hours of 4 cm × 4 cm × 16 cm specimens results in a water uptake of only 2 to 6% by weight, and same nonetheless retain more than 60% of their mechanical properties. If, in addition, the density of the shaped articles exceeds 1.6, the water uptake is even lower (2 to 3%) and more than 90% of the initial mechanical properties are retained. It too should be noted that the final density, after 24 hours of storage in air, of such shaped articles obtained via the process of the invention is comprised in general between 1.4 and 1.6 if the compacting pressure has been less than 100 kg/cm², and between 1.6 and 2.0 for greater pressures.

The shaped articles obtained according to the invention are of interest for a great number of applications. They are, specifically, admirable building materials capable of replacing plaster, concrete blocks or bricks. When substituted for the conventional plaster constructional units, the shaped articles of the invention impart substantial economy in the area of energy consumption during production and same are also able to perform support or load-bearing functions while having but slight thicknesses and being of great length, which of course is not possible with conventional plaster materials. When replacing elements of concrete or brick, the materials of the invention afford additional advantages, while performing equivalently, such as, for example, in the fields of finish, thermal and acoustical insulation, and after the attractiveness of fabrication into more varied sizes and shapes, and of easier installation.

Moreover, it has been found by using raw materials, i.e., gypsum and plaster, of synthetic chemical origin in accordance with the instant invention, the surface quality of the resultant cast materials is substantially improved, indeed, to the point where the cast material is ready for immediate use without coating or finishing. The material obtained in accordance with the invention is homogeneous and its surfaces are smooth.

In a second embodiment or aspect of the invention, shaped, compacted articles having greater properties are obtained from mixtures, the synthetic plaster content of which ranges from 60 to 99% by weight, by adding thereto a certain, predetermined amount of water.

The invention in this second aspect features the improved, low pressure compacting of mixtures containing synthetic gypsum and synthetic plaster, characterized by the fact that the mix comprises (i) a synthetic gypsum containing 0 to 40% by weight water, (ii) synthetic plaster, the percentage by weight of the synthetic plaster in the gypsum/plaster mixture varying between 60 and 99%, and (iii) water, in such amount that the free water content of the gypsum together with the water added total an excess vis-a-vis that amount stoichiometrically required for subsequent setting of the mixture, said excess of water being no greater than 15%, i.e., between 0 and 15% by weight, with respect to the total weight of the mixture.

One advantage of the process according to the invention is that it specifically permits obtaining good mechanical properties, the final products having a relatively low final density, by employing low compacting pressures. Thus, to obtain identical mechanical properties from a mix with a plaster content of 30 to 60%, compression under much higher pressures and utilization of a much greater total weight amount are necessary.

The gypsum employed consistent with this second aspect of the invention is synthetic and may be of the same origin as was the case with the first embodiment, and has a water content preferably in the range of between 0 and 40%. It is of advantage to use a powdery gypsum to insure against its becoming pasty during processing. Its granulometry is as noted above, and the gypsum too may be replaced by any of those fibrous or particulate, "wet" materials aforenoted, in like manner.

The plaster also is synthetic and as defined above.

The synthetic gypsum/synthetic plaster mixture according to the invention in this second respect is such that the percentage by weight of the plaster in the mix is between 60 and 99%. This plaster content may be specifically adjusted in the mixture as a function of any predetermined amount of excess water selected by the worker, such adjustment being of course within the limits of the invention.

The water may be added to the gypsum/plaster mixture in such a manner that the water content of the gypsum and the additional water total an excess with respect to the stoichiometric amount necessary for subsequent setting of the mixture. The water content of the moist gypsum, and the additional water react under pressure with the plaster in the mixture to form dihydrated calcium sulfate, which is settable. The amount of the additional water must be such that the excess is no greater than 15%, i.e., between 0 and 15%, by weight with respect to the total weight of the mixture, and preferably between 2 and 8%.

Prior to compacting, it is necessary to first thoroughly admix the gypsum and the plaster. This operation may be performed by any known means, for example, with the aid of a turbine, helical or another type agitator or a screw agitator.

The water is preferentially added after at least some portion of the gypsum and the plaster has been mixed; it is of interest to note that it is possible to store the mixture for a certain period of time prior to the addition of the water, which represents yet an additional advantage of the process of the invention.

The compacting pressures employed are those defined above.

The advantages and applications of the process according to its second aspect are the same as those attainable via the first embodiment. The shaped articles thus obtained have improved surface quality, i.e., of a finished appearance, and, specifically, display elevated mechanical properties and low water uptake upon immersion in water. Thus, for example, bending and compressive strengths measured on 4 cm×4 cm×16 cm bars, 24 hours after compacting and obtained under compacting pressures of less than 100 kg/cm$^2$, vary within the following ranges:

25≦bending, kg/cm$^2$≦110
50≦compression, kg/cm$^2$≦450
Surface hardness, Shore scale C≧80

In addition, for example, by increasing the compacted weight for the same given volume (4 cm×4 cm×16 cm) and, accordingly, the compacting pressure required, it is impossible to obtain up to 150 kg/cm$^2$ in bending strength and up to 600 kg/cm$^2$ in compressive strength, for a compacting pressure of up to 300 kg/cm$^2$.

Further, the water uptake by immersion in water of the shaped articles of the invention is very low; thus, for example, immersion for 24 hours in water of 4 cm×4 cm×16 cm specimens results in a water uptake of only 2 to 6% by weight and the specimens retain more than 60% of their mechanical properties. If, in addition, the density of the shaped article exceeds 1.6, the water uptake is still lower (2 to 3%) and more than 90% of the initial mechanical properties are retained. It should be noted that the final density after 24 hours of storage in air of shaped articles obtained by the process of the invention is typically comprised between 1.4 and 1.7 if the compacting pressure be less than 100 kg/cm$^2$, and between 1.7 and 2.0 for higher pressures.

The shaped articles obtained according to the invention in accordance with the second embodiment of employing from 60 to 99% by weight of the mix of plaster are useful in the same fields of application as those obtained via the first embodiment.

In order to further illustrate the present invention and the advantages thereof, the following specific examples are given, it being understood that same are intended as ilustrative and in nowise limitative.

In the examples which follow, all experiments were conducted utilizing molds yielding specimens having the dimensions 4 cm×4 cm×16 cm, or squares having a surface area of 400 cm$^2$ and heights varying between 15 and 20 cm.

The process was performed, in general, in the following manner:

[1] Into an anchor agitated vessel, the "moist" gypsum was placed for 30 seconds;

[2] The plaster was then added under rapid agitation;

[3] The mixture was placed in the selected mold, without tamping or vibrating;

[4] The mixture was compressed to the final volume desired, this operation being for 15 seconds and typically required the application of a pressure less than or equal to 100 kg/cm$^2$;

[5] Immediately thereafter, the specimen was recovered from the mold;

[6] The material cast in the above manner was left to stand in the free air, under ambient conditions, for 48 hours; and

[7] The following properties were thence measured:
SHORE scale, C hardness;
Bending strength;
Compressive strength; and
Final density.

EXAMPLE 1

This example demonstrates the effects attributable to the weight of the compacted mixture, for a given final volume.

A phosphogypsum was neutralized, then filtered and used as recovered as the filter cake. Its characteristics were the following: Free water content 25% by weight, Blaine surface (measured dry) 2250 cm$^2$/g, and a granulometry such that the percentage of particles having sizes less than 30 microns was 15%.

The plaster used, i.e., phosphoplaster, was derived via calcination of the above phosphogypsum, it had a pH of 5.8, its infrared heating loss was 5.6%, its Blaine surface area 3200 cm$^2$/g and its granulometry such that the percentage of particles having sizes less than 30 microns was 34%.

A mixture was formulated having the proportions of 52.5% synthetic plaster and 47.5% phosphogypsum.

Different weights of the mixture were placed into a 4 cm×4 cm×16 cm mode and compacted to a final volume of 256 cm$^3$.

The following results were obtained:

TABLE I

|  | Weight of compacted mixture (g) | | |
| --- | --- | --- | --- |
|  | 400 | 435 | 470 |
| Pressure required for compacting (kg/cm$^2$) | 88 | 153 | 244 |
| Final density | 1.49 | 1.62 | 1.75 |
| Bending strength (kg/cm$^2$) | 37.5 | 42.5 | 50 |
| Compressive strength (kg/cm$^2$) | 115 | 140 | 165 |
| Shore hardness, C scale | 95 | 97 | 100 |

It appears that the pressure required for compacting and the final density of the resultant product increases much more rapidly than the values for the other properties noted, if the weight of the compacted mixture be increased.

EXAMPLE 2

This example demonstrates the effects attributable to the percentages by weight of the synthetic plaster in the mixture.

With the gypsum and the plaster of Example I, the admixture and compacting were performed at a constant weight equal to 400 g for a volume of 256 cm$^3$, while varying the proportion of the plaster. Because the free water content of the gypsum remained constant, the results evidence a variation in the amount of excess water theoretically required with respect to the stoichiometry of hydration of the gypsum semihydrate. In this example:

For 23% plaster in the mix, the excess water was 15%, for 45% plaster in the mix, the excess water was 6.7%, for 52.5% plaster in the mix, the excess water was 2.14%. The following results were obtained:

TABLE II

|  | % by weight of plaster in mixture | | |
|---|---|---|---|
|  | 23 | 42 | 53.5 |
| Pressure required for compacting (kg/cm$^2$) | 60 | 75 | 88 |
| Final density | 1.38 | 1.45 | 1.49 |
| Bending strength (kg/cm$^2$) | 6 | 23 | 37.5 |
| Compressive strength (kg/cm$^2$) | 16 | 70 | 115 |
| Shore hardness, C scale | 85 | 90 | 95 |

It appears that for a given free water content (here 25%), the percentage by weight of plaster strongly affects the various properties: in order to attain acceptable final properties without employing high compacting pressures and without high final densities, this percentage should be higher than 30% and preferably between 40 and 60%.

EXAMPLE 3

This example demonstrates the effects attributable to the water content of the gypsum in the mixture.

A phosphogypsum derived from the action of sulfuric acid on phosphate from Morocco, with a Blaine surface area of 2100 cm$^2$/g and a granulometry such that the percentage of particles having sizes less than 30 microns was 15%, its water content is given below.

The plaster employed was derived via calcination of the phosphogypsum described above, its characteristics were the following: pH 4.4, Blaine surface 3100 cm$^2$/g, percentage of particles having sizes less than 30 microns 25%, infrared heating loss 5.7%.

A mixture was prepared from 212.5 g plaster, and gypsum of which dry state weight is 212.5 g. Because of the water content of the gypsum, a variable quantity of water was added to the above amount as a function of the water content of the gypsum: as a result, an excess of water which varied with respect to the stoichiometry of the hydration reaction of the semihydrate in the gypsum was employed.

With respect to the weight of the mixture utilized herein, if:
The water content of the gypsum was 15%, a deficiency of water was present.
The water content of the gypsum was 22.5%, the excess water was 4%.
The water content of the gypsum was 29.1%, the excess water was 10%.
Four hundred g of the mixture were compacted to a final volume of 256 cm$^3$.

The following results were obtained:

TABLE III

|  | Water content of gypsum (by weight) | | |
|---|---|---|---|
|  | 15% | 22.5% | 29.1% |
| Pressure required for compacting (kg/cm$^2$) | 100 | 80 | 65 |
| Final density | 1.80 | 1.46 | 1.40 |
| Bending strength (kg/cm$^2$) | 12 | 50 | 30 |
| Compressive strength (kg/cm$^2$) | 30 | 92 | 70 |
| Shore hardness, C scale | 65 | 91 | 87 |

If a deficiency of water is employed (gypsum having 15% water content), the results are unfavorable. Also, if a large excess of water is used (more than 15% of the total weight) the mechanical properties are strongly degraded, even though this amount of water content favors low compacting pressures and low final densities of the products.

EXAMPLE 4

This example demonstrates the effects attributable to the Blaine surface area of the plaster in the mixture.

A phosphogypsum identical to that described in Example 1 was used and a plaster having the same origin as the plaster of Example 1 was employed, with the following variations:

[i] As such, it had the following characteristics: Blaine surface 3200 cm$^2$/g, percentage of particles having sizes less than 30 microns 15%, apparent density 0.718.

[ii] Ground, it had the following characteristics: Blaine surface 6400 cm$^2$/g, percentage of particles having sizes less than 30 microns 52%, apparent density 0.675.

[iii] 50/50 mixture of "as such" and ground plaster; it had the following characteristics: Blaine surface 4300 cm$^2$/g, apparent density 0.690.

Four hundred g of the mixture (plaster/moist gypsum) were compacted to a final volume of 256 cm$^3$; the plaster represents 52.6% by weight of the mixture and the moist gypsum 47.5%, the free water content of the gypsum was 25%.

The following results were obtained:

TABLE IV

|  | Blaine surface of plaster, cm$^2$/g | | |
|---|---|---|---|
|  | 3200 | 4300 | 6400 |
| Compacting pressure (kg/cm$^2$) | 88 | 80 | 96 |
| Final density | 1.49 | 1.49 | 1.49 |
| Bending strength (kg/cm$^2$) | 37.5 | 34 | 40 |
| Compressive strength (kg/cm$^2$) | 115 | 81 | 130 |
| Shore hardness, C scale | 95 | 90 | 100 |

It appears that the greater granulometric distributions require less compacting pressure, but the mechanical properties are reduced (mixture with a Blaine surface of 4300).

In contrast, the finer the granulometry and the more it is controlled (Blaine surface of 6400), the better the properties.

EXAMPLE 5

This example demonstrates the effects attributable to the Blaine surface area of the gypsum in the mixture.

A phosphogypsum derived from the action of sulfuric acid on Togolese phosphate and presenting the following characteristics was used: water content 26% by weight; Blaine surface, two cases: 1st case, 2250 cm$^2$/g with 15% of particles having sizes less than 30 microns; 2nd case, 7900 cm$^2$/g with 60% of particles having sizes less than 30 microns.

The plaster used was obtained by calcination of the above phosphogypsum, its characteristics were the following: Blaine surface 2050 cm²/g, granulometry such that the percentage of particles having sizes less than 30 microns was 12%.

The mixture consisted of 50% by weight of each of the plaster and the phosphogypsum.

Experiments were performed, first by compacting 400 g of the mixture into 256 cm³ and then 400 g of the mixture into 256 cm³.

The following results were obtained:

TABLE V

|  | Blaine surface of gypsum, cm²/g | | |
|---|---|---|---|
|  | 2250<br>Weight of compacted mixture, 440 g | 7900<br>Weight of compacted mixture, 440 g | 7900<br>Weight of compacted mixture, 440 g |
| Pressure required for compacting (kg/cm²) | 96 | 58 | 96 |
| Final density | 1.47 | 1.47 | 1.60 |
| Bending strength (kg/cm²) | 43 | 33 | 50 |
| Compressive strength (kg/cm²) | 137 | 65 | 170 |
| Shore hardness, C scale | 94 | 91 | 98 |

It appears that an increase in the Blaine surface of the gypsum gives rise to a reduced compacting pressure requirement, but also to diminished mechanical properties for the same weight of the compacted mixture. However, if the weight of the compacted mixture be increased, the mechanical properties obtained also rise without an excessive increase in the pressure.

EXAMPLE 6

The following experiments were performed by using molds providing specimens with the dimensions 4 cm × 4 cm × 16 cm.

The following procedure was followed: into an agitator of anchor type was charged an amount of phosphogypsum derived from the action of sulfuric acid on Togolese phosphate; this phosphogypsum had a water content of 21%. The phosphogypsum was unground, and its characteristics included a granulometry between 15 and 100 microns, the granulometric curve being centered at 45 microns. Plaster obtained by calcination of the above phosphogypsum was added, its characteristics being as follows: heating loss 5.8, granulometry between 15 and 80 microns and centered at 40 microns. The agitator was started and water added drop by drop, such that the water attributed to that of the moist gypsum plus the added water totaled an excess water with respect to that amount stoichiometrically required for the hydration of the plaster, which excess was, respectively, 2.6%, 10.3%, 7.6%, 3.2% and 2.7% by weight of the gypsum/plaster mixture. When the addition was completed, the mixture was placed in the mold and thence compacted. After removal from the mold, the specimens were left to stand for 48 hours at ambient temperature and their properties were then measured.

Results are given in the following tables:

TABLE VI

| Characteristics of the Mixture | Experiment | | | | |
|---|---|---|---|---|---|
|  | 1 | 2 | 3 | 4 | 5 |
| Compacted weight for 256 cm³ final volume (g) | 407 | 410 | 420 | 433 | 500 |
| Compacting pressure (kg/cm²) | 96 | 85 | 83 | 80 | 144 |
| Percentage by weight of mixture: | | | | | |
| Plaster; | 67 | 60 | 74.5 | 74 | 80 |
| Gypsum; | 21.7 | 23 | 4.8 | 5 | 2.2 |
| Excess water; | 2.6 | 10.3 | 7.6 | 8.2 | 2.7 |
| Added water | 10.8 | 17 | 20.7 | 21 | 17.8 |

TABLE VIII

| Characteristics of Specimens | Experiment | | | | |
|---|---|---|---|---|---|
| After 48 hours | 1 | 2 | 3 | 4 | 5 |
| Density | 1.53 | 1.6 | 1.67 | 1.54 | 1.89 |
| Bending strength (kg/cm²) | 80 | 78 | 85 | 110 | 140 |
| Compressive strength (kg/cm²) | 245 | 220 | 270 | 250 | 490 |
| Shore hardness, C scale | 98 | 100 | 100 | 100 | 100 |

The advantage of the process of the invention is readily apparent: it enables obtainment of excellent mechanical properties for a relatively low final density material by using low compacting pressures.

COMPARATIVE EXAMPLE 1

This comparative example will demonstrate the effects attributable to using a "natural" plaster in place of a synthetic plaster.

A phosphogypsum originating in the digestion of a Togo mineral by sulfuric acid and a natural mineral (Lambert F 7) containing 80% β-semihydrate (fire loss 6.1%), were used.

The phosphogypsum used contains 19% free water. 750 g of moist phosphogypsum and 750 g of natural plaster are mixed together. A series of experiments is performed wherein the excess water is varied with respect to stoichiometry from 0 to 10%. The excess water percentage is calculated with respect to the weight of the dry sample.

In order to obtain the water contents desired, increasing amounts of water are added to the abovecited mixture by means of an external inlet. The mode of operation described in Example 1 is followed. The following results were obtained.

TABLE IX

| Nature of Gypsum | Nature of Plaster | Density | Bending Strength kg/cm² | Compression Strength kg/cm² | % Loss of water | % Excess water | *Δ = y − x |
|---|---|---|---|---|---|---|---|
| Togo phosphogypsum | Natural plaster | 1.51 | 23 | 60 | 5.3 | 0 | 5.3 |
| Togo phosphogypsum | Natural plaster | 1.57 | 25.75 | 69 | 6.2 | 2 | 4.2 |
| Togo phosphogypsum | Natural plaster | 1.58 | 25 | 65 | 8.6 | 5 | 3.6 |
| Togo phosphogypsum | Natural plaster | 1.59 | 25.75 | 60 | 10.5 | 8 | 2.5 |
| Togo phosphogypsum | Natural plaster | 1.58 | 24.5 | 74.5 | 12.4 | 10 | 2.4 |

* y = The percentage of loss by weight through drying
  x = The percentage of excess water As can be seen, the compressive and bending strengths are low and do not, in actuality, satisfy the requirements of a load bearing material.

EXAMPLE 7

In comparison with Comparative Example 1, the same Togo phosphogypsum from Togo as used in said Example was used, but the "natural" plaster was replaced with a phosphoplaster obtained by the calcination of the phosphogypsum. The latter contained more than 80% β-semihydrate (firing loss 6.5%).

The mode of operation described hereinabove is reproduced identically. The results are reproduced below in Table X.

TABLE X

| Nature of Gypsum | Nature of Plaster | Density | Bending Strength kg/xm$^2$ | Compressive Strength kg/cm$^2$ | % Water Loss | % Excess Water | *Δ = y − x |
|---|---|---|---|---|---|---|---|
| Phosphogypsum from Togo | Phosphoplaster from Togo | 1.55 | 23.75 | 99.5 | 5 | 0 | 5 |
| Phosphogypsum from Togo | Phosphoplaster from Togo | 1.55 | 33 | 107 | 7 | 2 | 5 |
| Phosphogypsum from Togo | Phosphoplaster from Togo | 1.57 | 36.25 | 119.5 | 8.5 | 5 | 3.5 |
| Phosphogypsum from Togo | Phosphoplaster from Togo | 1.57 | 39.5 | 113.8 | 11 | 8 | 3 |
| Phosphogypsum from Togo | Phosphoplaster from Togo | 1.57 | 34.25 | 130 | 12.5 | 10 | 1.5 |

* y = The percentage of loss by weight through drying
x = The percentage of excess water It can be seen that the bending and compressive strengths are improved by at least 30% and at least 60%, respectively, upon employing a synthetic phosphoplaster instead of a natural plaster [as per Comparative Example 1].

In addition to all the aforenoted advantages, including improved mechanical properties, other advantages to employing the composition and process of the instant invention include the use of two manufacturing by-products (both synthetic gypsum and synthetic plaster), thus leading to an economically practical product. Furthermore, by employing a synthetic plaster such as phosphoplaster instead of natural plaster, for given equal mechanical properties, a lighter material is obtained, which is of great importance to the user.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A settable molding composition, which comprises a mix of a synthetic plaster having a Blaine surface area in the range from about 2,500 to about 7,000 cm$^2$/g and a water donor therefor selected from the group consisting of synthetic gypsum having a given content of water and a mixture of said synthetic gypsum and free water, said plaster comprising from about 30% to about 99% by weight of the mix and the amount of free available water in the mix from the water donor being in excess of that amount stoichiometrically required for ultimate complete setting of the mix, with said excess of free available water comprising between 0 and 15% by weight of the total weight of said mix.

2. The settable molding composition as defined by claim 1 wherein the amount of excess water ranges from about 2 to about 8% by weight of the mix.

3. The settable molding composition as defined by claim 1 wherein the plaster is phosphoplaster and the gypsum is phosphogypsum.

4. The settable molding composition as defined by claim 1 wherein the water donor comprises a wet synthetic gypsum having a free water content of between about 15 and 40% by weight.

5. The settable molding composition of claim 1 or 4 wherein the percentage by weight of the synthetic plaster in the mix is between about 30 and 60%.

6. The settable molding composition of claim 1 or 3 wherein the synthetic plaster has a granulometric distribution such that the major part of the particles are of a size in the range from about 20 to about 100 microns.

7. The settable molding composition as defined by claim 4 wherein the wet gypsum has a free water content of between about 25 and 35% by weight.

8. The settable molding composition as defined by claim 3 wherein the phosphogypsum has a Blaine surface area ranging between about 1000 and 4000 cm$^2$/g.

9. The settable molding composition as defined by claim 1 wherein the water donor comprises a wet synthetic gypsum having a free water content of between about 0 and 40% by weight.

10. The settable molding composition as defined by claim 1 or 9 wherein the water donor comprises a mixture of wet synthetic gypsum and free water, and wherein the percentage by weight of plaster in the mix is between about 60 and 99%.

11. The settable molding composition as defined by claim 1 wherein said mix further includes at least one member selected from the group consisting of an filler, a water repellant, a neutralizing agent, a reinforcing agent, a mineral agent and a synthetic polymer.

12. The settable molding composition of claim 1 wherein said mix further comprises a wet material selected from the group consisting of wet material fibers, wet vermiculite, wet sand, and wet mineral powder.

13. A shaped article comprised of the composition of claim 1, 2, 3, 4, 11 or 12.

14. The shaped article of claim 13 wherein same is a modular constructional unit selected from the group consisting of a brick, block, square, plate, composite, facade, casing, flooring and load-bearing member.

* * * * *